(12) United States Patent
Gurin et al.

(10) Patent No.: US 8,672,643 B2
(45) Date of Patent: Mar. 18, 2014

(54) METHOD AND SYSTEM FOR ANODE GAS RECIRCULATION IN FUEL CELLS

(75) Inventors: Victor Gurin, Hollywood, FL (US); Roman Gromov, Fort Lauderdale, FL (US); Serguei Permiakov, Kanata (CA)

(73) Assignee: Helpful Alliance Company, Miami, FL (US)

( * ) Notice: Subject to any disclaimer, the term of this patent is extended or adjusted under 35 U.S.C. 154(b) by 1028 days.

(21) Appl. No.: 12/384,588

(22) Filed: Apr. 7, 2009

(65) Prior Publication Data

US 2010/0255386 A1    Oct. 7, 2010

(51) Int. Cl.
*F04F 5/22*    (2006.01)
*F04F 5/48*    (2006.01)

(52) U.S. Cl.
USPC ............ 417/166; 417/167; 417/180; 417/187

(58) Field of Classification Search
USPC ......... 417/163, 165–168, 179, 180, 182, 187, 417/189
See application file for complete search history.

(56) References Cited

U.S. PATENT DOCUMENTS

| | | | | |
|---|---|---|---|---|
| 1,444,539 A | * | 2/1923 | Ehrhart | 417/170 |
| 3,680,327 A | * | 8/1972 | Stein | 62/226 |
| 3,694,107 A | * | 9/1972 | Stein | 417/167 |
| 3,959,864 A | * | 6/1976 | Tell | 29/888 |
| 4,168,803 A | * | 9/1979 | Simmons et al. | 239/400 |
| 4,696,625 A | * | 9/1987 | Greenberg | 417/174 |

* cited by examiner

*Primary Examiner* — Charles Freay
(74) *Attorney, Agent, or Firm* — Abraham Hershkovitz; Hershkovitz & Associates, PLLC; Eugene Rzucidlo

(57) ABSTRACT

One of the main objects in providing optimal mass exchange for fuel cells, especially mobile fuel cells, is anode gas supply to fuel cell stack based on stoichiometric characteristics depending on variable loads and anode gas recirculation. External loads may vary in wide range and arbitrary change, thus complicate the optimal mass exchange in fuel cell stack. A new original technology is disclosed for anode gas supply using a multi-stage ejector. This technology, an ejector design and control system allow increasing fuel cell efficiency with quick loads changing from minimal to maximal as well as at cold start.

5 Claims, 4 Drawing Sheets

METHOD AND SYSTEM FOR ANODE GAS RECIRCULATION IN FUEL CELLS

FIELD OF THE INVENTION

This invention relates equally to solid oxide fuel cell and proton exchange membrane fuel cell systems as well as to other applications, e.g. with high temperatures, where ejection reagent supply is more practical.

BACKGROUND OF THE INVENTION

A typical fuel cell system consists of a number of fuel cell units arranged in a stack; each fuel cell unit includes anode and cathode which are provided on either side of electrolyte. Hydrogen, which functions as a fuel, is supplied to the anodes while air, which functions as an oxidizing gas, is supplied to the cathodes. Catalytic reaction within fuel cell generates electric power. The difference between solid oxide fuel cells (SOFC) and proton exchange fuel cells lies in construction materials and operating temperatures that determine the type of catalytic reaction.

But for both SOFC and PEM FC effective hydrogen supply to anode active centers requires optimal water balance and removal of by-product inert gases. Hydrogen-containing gases supplied from reformer has high content of inert gases-impurities that block access of working reagent to active centers. This effect is known as a "blanket". To destroy such "blocking blanket" a gas recirculation with help of fans, diaphragm pumps or ejectors is used. During PEM FC operation and, especially, re-activation nitrogen is accumulated at fuel cell stack's anode chambers (up to 60%), including supply of pure hydrogen to anodes and air to cathodes. It should be noted that in order to effectively remove impurities at low loads the anode gas recirculation above "stoichiometric" is required because the anodes should be ready for maximal loads at any time. In existing PEM FC designs electromechanical fans or blowers are used. They are provided increased flow speed of recirculating anode gas (in 2.5 ... 3.5 times) above that required at maximal load. It is also known that grease is not allowed for internal surfaces of gas reagents supply devices. It should be also noted that in hydrogen environment most materials absorb the hydrogen. Hydrogen diffuses into metals, plastics and rubbers; the diffusion is increased significant at high temperatures. As a result the metals or plastics embrittlement and construction destruction are observed, beginning with support bearings that operate at high revolutions, about $(15 \ldots 17) \times 10^3$ rpm. Under such circumstances electromechanical grease-free fans show very low service-life, less than 700 hours.

Therefore gas jet ejector as an anode gas circulator arouses interest because it allows providing gas recirculation with directing high pressure working gas through an ejector nozzle. A typical ejector or a Venturi tube can ideally serve as a gas circulator at high pressure and slightly or non-varying gas flow speed downstream nozzle. In case of mobile fuel cell systems with loads and working gas flow speeds varying irregularly from a "near zero" level to maximum or peak level, said parameters vary by 100 and 1000 times accordingly. Injection and gas dynamic pressure characteristics also vary in wide range. Reaching optimal mass exchange in fuel cells is the largest problem at "near zero" and minimal loads no greater than 35% from maximal load.

An attempt to adjust gas flow speed with changing the nozzle cross-section using a central rod does not solve the problem because working gas flow speed through the ejector nozzle sharply decreases and at the same time the basic geometrical characteristic of the ejector increases resulting in decrease of ejection factor (anode gas recirculation). The basic geometrical characteristic of the ejector is a ratio of ejector mixing chamber area to an area of working gas jet ejecting through the nozzle. This characteristic has a main effect on the output performance of the ejector: ejection factor and gas dynamic pressure.

For example in U.S. Pat. No. 6,868,340 nozzle output and mixing passage areas are adjusted simultaneously using a predetermined profiled needle. The needle moves along the central axis of nozzle and mixing passage. The area of an opening around the needle in the opening of the nozzle is changed synchronously with the area around another portion of the needle in the inlet part of the mixing passage or diffuser. The needle is movable along the central axis by diaphragms wherein the end of needle is inserted. The pressures from FCS anodes and cathodes are applied to the diaphragms. The drawback of such approach is significant decrease of the flow speed through the nozzle and mixing passage. This results in decrease of ejector output characteristics by 30 ... 40% and full inefficiency at minimal loads with near zero flows.

It is known fact that in mobile applications as well as other applications they provide a power reserve in case of "peak" power loads for a short period of time. Most periods of time (85%) mobile power generating systems operate at power loads less than 35% of maximal design power. Maximal or "peak" powers are used within 2% of total operational period. Other 10 ... 15% of time slightly exceed 35% of maximal power. Thereby it is worth to optimize the anode gas supply flows in order to intensify anode gas recirculation at variable loads. In this connection multi-stage ejectors are used for gas supply when two or more ejectors operate separately or simultaneously. Such approach is used in US Application Publication No. 2005/0064255 that includes a high-flow ejector and low-flow ejector with common mixing chamber. Having two ejectors leads to space requirement concern and a transition point when gas flow changes from low-flow to high-flow ejector, experiences a drop in recirculation flow.

The present invention addresses these and other needs and provides further related advantages.

SUMMARY OF THE INVENTION

The present invention provides a method and system for the components supply (e.g. anode gas) that characterize by stepless gas supply and recirculation irrespective of load variations.

The proposed jet ejector comprises:
i. a common mixing chamber fluidly connected with recirculation line to an anode outlet of the fuel cell stack;
ii. a central nozzle positioned in the common mixing chamber and fluidly connected to a first inlet configured to receive a first flow from a reactant source;
iii. peripheral nozzles positioned in the common mixing chamber aligned axially or at small angle with the central nozzle and fluidly connected to a second inlet configured to receive a second flow from the reactant source;
iv. a common diffuser fluidly connected to a discharge outlet to provide the inlet stream to the fuel cell stack.

The ejector may further comprise one-way circular valve to provide a third flow to the inlet stream in case of peak-demand loads.

It is obvious that an ideal approach for fuel cells is reagents supply and, accordingly, their recirculation through fuel cell stack without any restrictions in time and loads in all range of system operation conditions. A small deviation of control parameters from optimum is allowable in most of mass- and heat processes; for example, small pressure changes in fuel cell stack's anode or cathode chambers result in three-phase "gas-catalyst-electrolyte" boundary shift and improvement of electrode porous structure. It leads to improvement in mass transfer parameters and fuel cell system output characteristics, e.g. output power. Therefore it is advisable some pressure pulsations in porous anode structure, activating gas exchange in electrode capillary. Such pressure pulsation is easily achieved by anode gas ejection recirculation using relay pressure control system for the FCS anode gas.

DETAILED DESCRIPTION OF THE DRAWINGS

Hereinafter the present invention will be explained with reference to the drawings.

Figure 1:
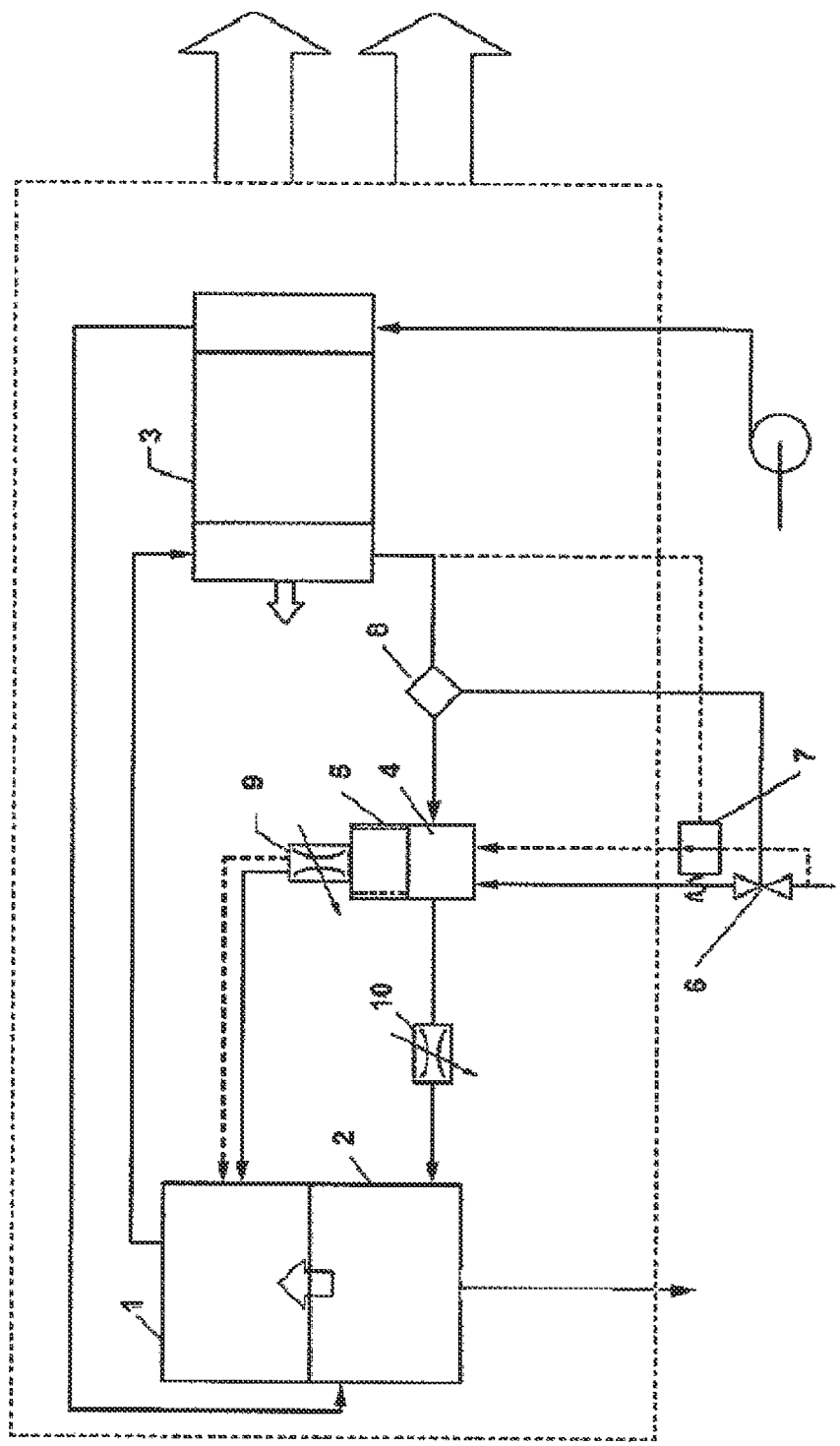
FIG. 1 is a schematic diagram showing the structure of a fuel cell system which has an ejector according to the present invention.

FIG. 1 is a schematic diagram showing the structure of a solid oxide fuel cell system which has a multistage ejector according to the present invention. The system includes fuel cell stack 3 comprising a plurality of fuel cells (not shown), each comprising an anode, a cathode and an electrolyte, a fuel processing unit 1, an afterburner 2, a multistage ejector 4 according to current invention. Fuel as a hydrocarbon fuel is supplied to fuel cell stack 3 through solenoid valve 6 having a feedback connection with pressure sensor 8 located in the discharge fuel line from the fuel cell stack 3, a central nozzle of the multistage ejector 4 to the fuel processing unit 1 where it reformates to hydrogen gas. An additional line supplies fuel to peripheral nozzles of the multistage ejector 4 through pressure regulator 7 having feedback connection with fuel cell stack's anode gas outlet. The hydrocarbon fuel is reformatted in the fuel processing unit 1 into mix of gaseous hydrogen, carbon monoxide and dioxide gases and supplied to the anode sides of the fuel cell stack 3. Air used as an oxidant is supplied through a compressor to the cathode sides of the fuel cell stack 3. Part of the fuel stream discharged from the fuel cell stack 3 is directed to the multistage ejector 4 where it merges with the fresh fuel stream. Another part of the fuel stream from the fuel cell stack 3 is directed though flow restrictor 10 to the afterburner 2 where remained hydrogen burns forming water and oxidizing carbon monoxide to carbon dioxide using oxygen from oxidant stream exhausted from the fuel cell stack 3. The heat generated in the afterburner 2 is used to keep the temperature in the fuel processing unit 1. The flow restrictor 10 provides that most of the fuel stream from the fuel stack 3 recirculates through the ejector 4.

Figure 2:
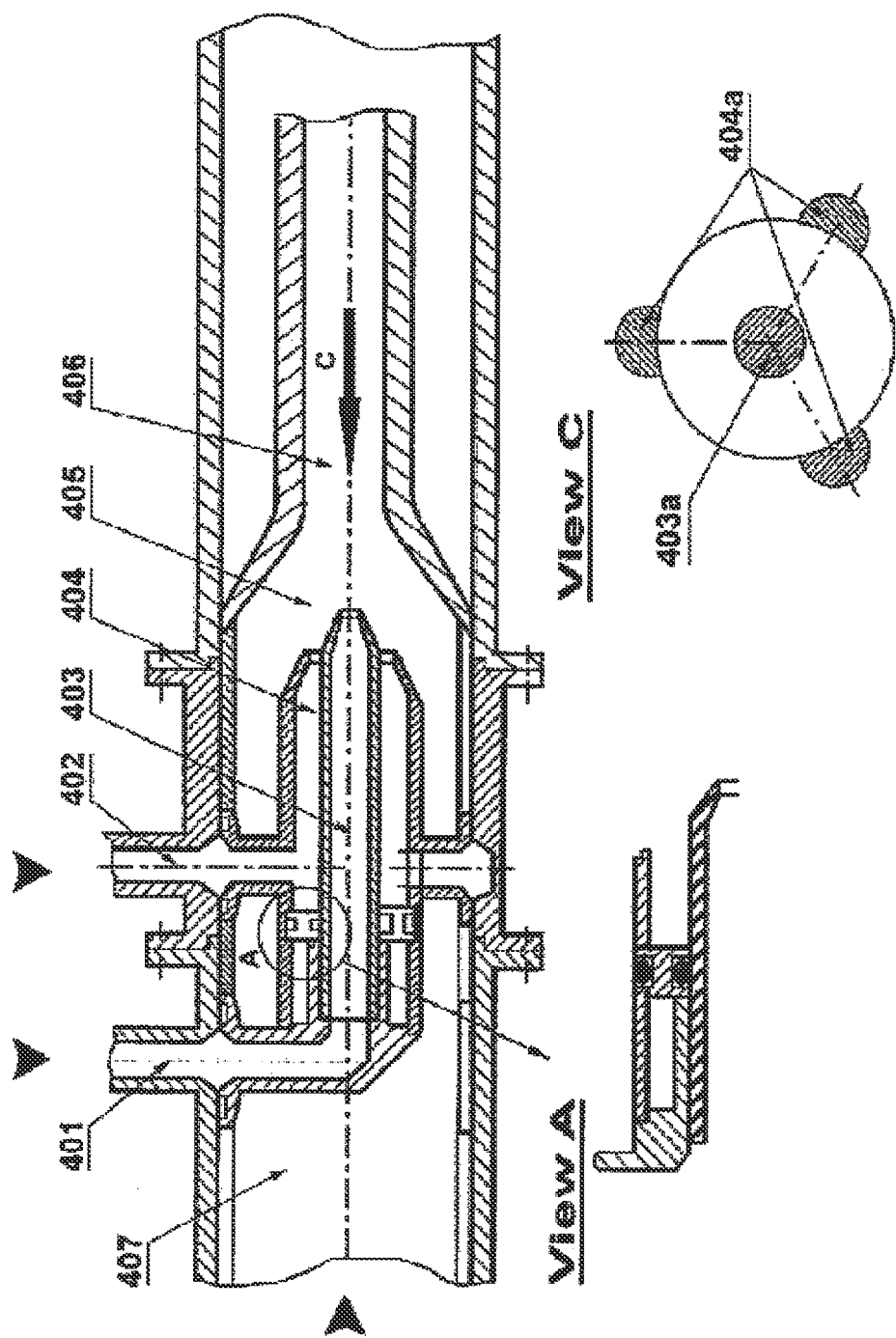
FIG. 2 is a cross-sectional side view of the ejector showing second stage peripheral nozzles.

FIG. 2 shows a multistage ejector according to the present invention. The ejector includes a common mixing chamber 405, a central nozzle 403, at least one peripheral nozzle 404, peripheral nozzles 404 are aligned with or at a small angle to the central nozzle 403, a common diffuser 406, a mixing chamber inlet 407, fluidly connected to the common mixing chamber 405, first inlet 401, fluidly connected to the central nozzle 403, second inlet 402, fluidly connected to the peripheral nozzles 404. Mixing chamber inlet 407 is configured to receive a recirculated flow from a fuel cell stack's discharge outlet, inlet 401 and inlet 402 are configured to receive a fuel flow from a fuel supply source.

The central nozzle 403 is designed to operate efficiently in low to medium (35+15%/−5%) load range of operating conditions of fuel cell system. In order to effectively destroy a "blanket" in the anode chambers of the fuel cell stack, especially at low loads conditions, a pulse pressure mode is used. The pressure sensor 8 (FIG. 1) measures the pressure in the recirculation line and when the pressure reaches the bottom set point it sends an "ON" signal to the solenoid valve 6 (FIG. 1). The valve 6 (FIG. 1) opens and fuel is supplied and ejected through the central nozzle 403 (FIG. 2) of the ejector. When the pressure reaches the upper set limit the pressure sensor 8 (FIG. 1) sends an "OFF" signal and the valve 6 (FIG. 1) stops fuel supply to the ejector. The bottom and upper set points of the pressure sensor 8 (FIG. 1) are configured to be within +15%/−5% of the nominal pressure for the anode chamber of the fuel cell stack. Pulses duration in this mode is proportional to the fuel cell load. This provides an anode recirculation stream proportional to the fuel stream supplied through the ejector and, thus, keeps gas-dynamic parameters in design range at arbitrary FCS loads. For mobile applications, taking into account the arbitrary load changes it is advisable to use such pulse pressure mode at loads no more than 35+15%/−5% of maximal load.

When loads exceed that level the fuel is additionally supplied to peripheral nozzles 404 (FIG. 2) while continuously ejecting fuel through the central nozzle 403 (FIG. 2) into a common mixing chamber 405 (FIG. 2) of the ejector. The peripheral nozzles 404 (FIG. 2) are aligned with or at a small angle to the central nozzle. The fuel is supplied through the additional nozzles when the pressure in the fuel cell stack decreases in, e.g., 3% from bottom set point for the central nozzle, i.e. when load exceeds 35+15%. This embodiment is effectively operates at two levels of loads: nominal 35+15%/−5% $P_{max}$ and maximal continuous $P_{max}$ and eliminates the transition point typical to multiple ejector systems as there is no switch between two stages of nozzles.

Figure 3:
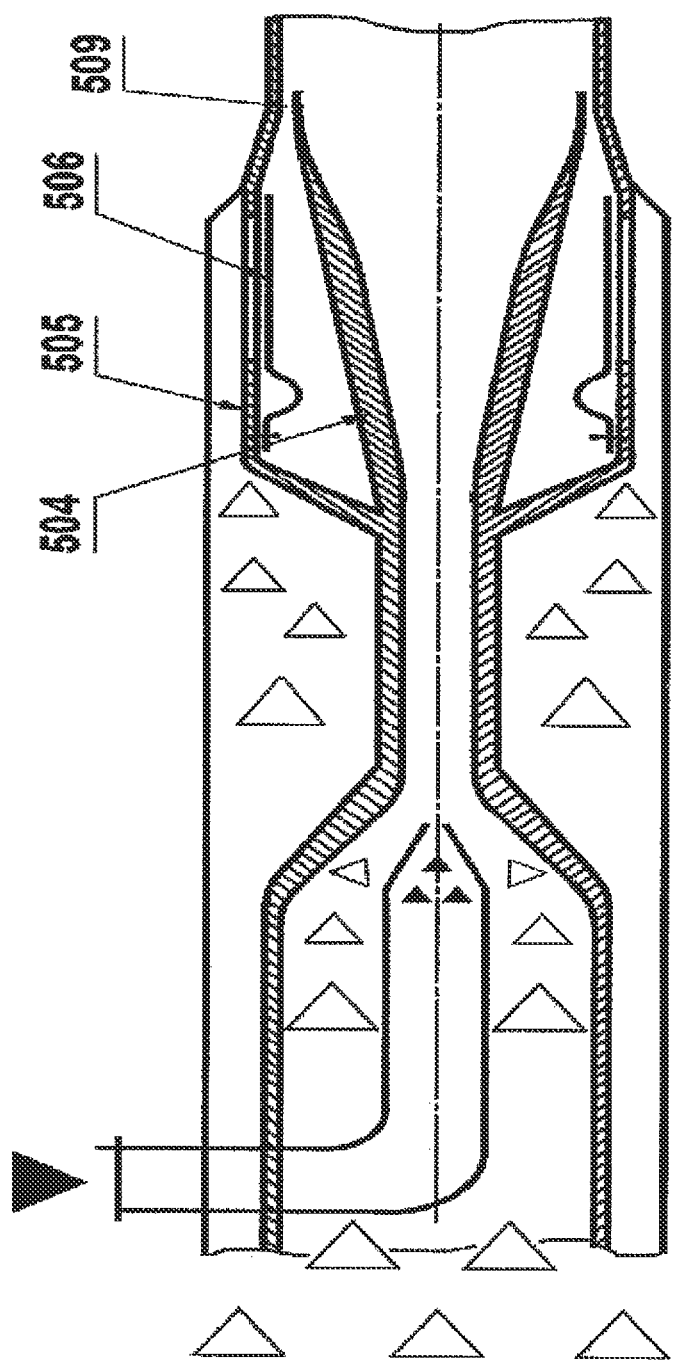
FIG. 3 is a cross-sectional side view of the ejector circular valve as third stage nozzles.

When there is peak-load demand $P_{peak}$ that exceeds maximal load $P_{max}$ in 1.3 . . . 1.5 times and lasts for a short time, e.g. tens of seconds, a third stage of fuel supply can be provided. FIG. 3 shows an embodiment with additional third stage nozzle 509 formed as a gap of a pre-determined size between output end of the diffuser 504 (5 in FIG. 1) and outer shell of the ejector to intensify the anode recirculated flow. In peak loads mode $P_{peak}$ when the ejected flow from the diffuser has maximum speed and force the part of anode recirculated flow can be fed though the circular valve 506 (FIG. 3) outside peripheral surface 505 (FIG. 3) of the diffuser providing some fresh anode gas to the recirculation flow in this space outside diffuser peripheral surface to keep material balance in fuel cell during peak load demands. The circular valve 506 can be a simple flap valve.

Figure 4:
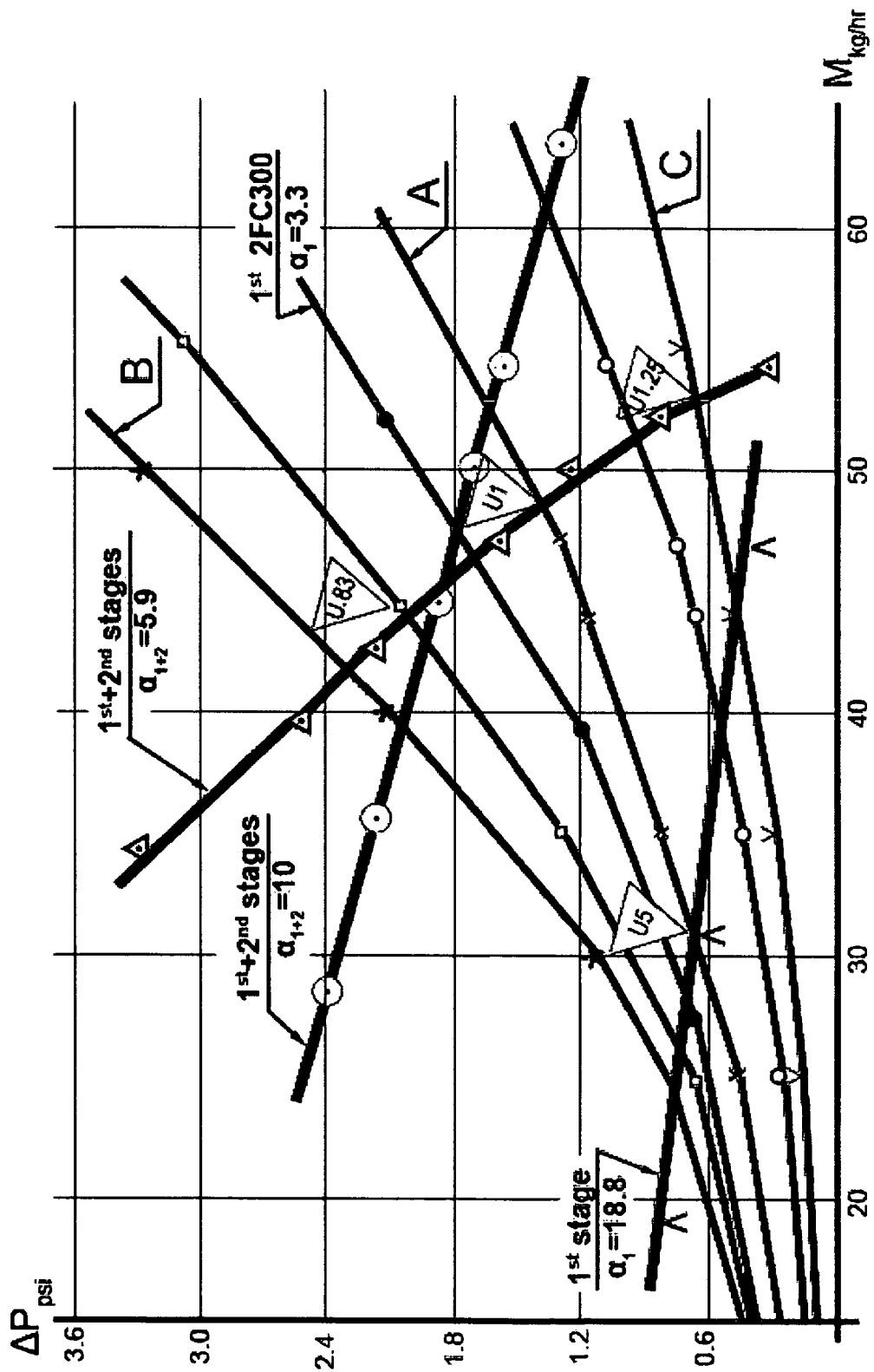
FIG. 4 is a diagram showing flow rate/pressure relationship for different operational modes of the ejector.

FIG. 4 shows experimental characteristics of a two-stage ejector according to the invention. A curve A is a nominal flow rate/pressure relationship in the recirculation system. Curves B and C show other limit relationships if the relative system resistance is increased or decreased, e.g. in 2 times, relative to nominal design value. The final ejector will have only one of these two characteristics. Curves "Inject 1" and "Inject 2" are characteristics of the ejector operated with $1^{st}$ stage and ($1^{st}$+$2^{nd}$) stage nozzles accordingly. These data show that when the ejector operates through $1^{st}$ stage nozzle only the ejection factor α is about 3.3-3.5 times higher than when it operates with $1^{st}$ and $2^{nd}$ stage nozzles simultaneously. It is caused by the fact that when the gas is supplied through the $1^{st}$ stage nozzle only the ratio of ejected and recirculated flows increases considerably whereas requirement for the compression ratio of a mixed flow is decreased. For small loads the optimum is an ejector with increased main geometrical parameter a which is a ratio of diameter of the ejector mixing chamber to the section of the nozzle. For large loads with increased gas flow through the nozzle the optimum is an ejector with decreased $\alpha$. The final ejector design should have a compromise between a parameter and a number of anode gas supply stages. The experiments show that if gas flow exceeds the flow for the $1^{st}$ stage but less than the flow for the $1^{st}$ and $2^{nd}$ stages the flow rate/pressure characteristics of the ejector can be estimated satisfactory (with error no more than 2.5%) with assumption that the total working flow correlate with the flow through the central nozzle. The same approach is used with the $3^{rd}$ stage gas supply. The $3^{rd}$ stage is additional nozzles formed on the periphery of the central nozzle or $2^{nd}$ stage nozzles with all flows directed to one common mixing chamber. In this case the ejection factor $\alpha$ decreases but this doesn't affect the FC operation as the exchange rate inside porous anodes is intensified. An optimization of the recirculation system and ejector parameters should be performed for each system design.

The invention claimed is:

1. A fuel cell system including a multistage ejector for anode gas recirculation in the fuel cell system, comprising the multistage ejector comprising:
    a) a multistage ejector body forming a fluid flow path and containing a common mixing chamber and a common diffuser;
    b) the multistage ejector body including a main central nozzle body including a first fresh anode gas inlet port and a main nozzle outlet wherein the main nozzle outlet is situated along the central axis of the multistage ejector body;
    c) the multistage ejector body further including a peripheral nozzle body including a second fresh anode gas inlet port and peripheral nozzle outlets being one of, aligned with, or arranged at a slight angle to the main nozzle outlet;
    d) wherein the common mixing chamber is formed in the common diffuser and the common diffuser is fluidically connected to the common mixing chamber for mixing fresh anode gas ejected from the main nozzle outlet and peripheral nozzle outlets with recirculating anode gas exiting a fuel cell stack.

2. The multistage ejector according to claim 1 wherein the main central nozzle body is used at nominal fuel cell loads of (35+15/−5%) of maximal loads for the fuel cells.

3. The multistage ejector according to claim 1 wherein, in addition to the main nozzle outlet, the peripheral nozzle outlets are used when fuel cell loads exceed nominal loads but no more than (70+15/−5%) of maximal loads for the fuel cells.

4. A fuel cell system including a multistage ejector for anode gas recirculation in the fuel cells, the multistage ejector comprising;
    a) a multistage ejector body forming a fluid flow path and containing a common mixing chamber and a common diffuser;
    b) the multistage ejector body including a main central nozzle body including a first fresh anode gas inlet port and a main nozzle outlet wherein the main nozzle outlet is situated along the central axis of the multistage ejector body;
    c) the multistage ejector body further including a peripheral nozzle body including second fresh anode gas inlet port and peripheral nozzle outlets being one of aligned with or arranged at a slight angle to the main nozzle outlet;
    d) wherein the common mixing chamber is formed in the common diffuser and the common diffuser is fluidically connected to the common mixing chamber for mixing the fresh anode gas ejected from the main nozzle outlet and peripheral nozzles with recirculating anode gas exiting a fuel cell stack; and
    e) a third nozzle formed at an outlet end of the diffuser and a circular valve for intake of additional anode gas recirculation flow with addition fresh anode gas beside the main nozzle outlet and peripheral nozzle outlets to intensify anode gas recirculation at peak loads.

5. The multistage ejector according to claim 4, wherein the third nozzle is used for a period of time at peak load that is 1.3-1.5 times higher than maximal loads for the fuel cells while fresh anode gas is ejected through both the main nozzle outlet and peripheral nozzle outlets.

* * * * *